United States Patent [19]

Godsted

[11] 4,439,077
[45] Mar. 27, 1984

[54] CONCRETE SCREW ANCHOR

[76] Inventor: Kent B. Godsted, 917 S. Allmen, Hinsdale, Ill. 60521

[21] Appl. No.: 347,809

[22] Filed: Feb. 11, 1982

[51] Int. Cl.³ .......................................... F16B 35/04
[52] U.S. Cl. .................... 411/411; 411/412
[58] Field of Search ............. 411/378, 411–413, 411/387, 417, 418

[56] References Cited

U.S. PATENT DOCUMENTS

| | | | |
|---|---|---|---|
| 1,933,332 | 10/1933 | May | 411/418 |
| 2,572,647 | 10/1951 | Merwin | 411/418 |
| 3,426,642 | 2/1969 | Phipard, Jr. | 411/417 |
| 3,748,949 | 7/1973 | Dreger | 411/411 |
| 3,937,119 | 2/1976 | Ernst | 411/422 |
| 3,982,464 | 9/1976 | Sygnator | 411/418 |
| 4,069,730 | 1/1978 | Gutshall | 411/417 X |

FOREIGN PATENT DOCUMENTS

| | | | |
|---|---|---|---|
| 639198 | 5/1962 | Italy | 411/417 |
| 2070996 | 3/1980 | United Kingdom | 411/413 |

*Primary Examiner*—Thomas J. Holko
*Assistant Examiner*—Thomas J. Dubnicka
*Attorney, Agent, or Firm*—Thomas W. Buckman; David I. Roche

[57] ABSTRACT

A threaded fastener designed for anchoring imbedment into masonry structures and more particularly into masonry structures which include relatively hard aggregate. A critical distinct relationship between parameters of a fastening system such as the lead angle of the thread, the included angle of the thread, the depth of imbedment of the crest of the thread in a bore of predetermined diameter exists in order to create an adequate effective fastening system for hard aggregate masonry or concrete.

5 Claims, 3 Drawing Figures

CONCRETE SCREW ANCHOR

BACKGROUND AND SUMMARY OF THE INVENTION

The present invention relates generally to an anchor device and more particularly to such a device which is designed to be secured within a bore formed in a masonry or concrete structure which structure is formed by utilizng relatively hard aggregate.

The securement techniques of devices, attachments, fixtures, etc. to concrete or masonry structures has typically utilized stud-like devices which are inserted in a bore or hole preformed in the masonry. The stud-type anchor must in some way be activated to create a wedging or slight imbedment within the walls of the concrete to properly provide suitable pull out strength in such applications. Recent advances in the art of securement to masonry structures have included screw threaded type anchors which threadingly engage the walls of a bore in the masonry or concrete. Examples of these screw anchors are shown in patents such as U.S. Pat. Nos. 3,902,399 and 3,937,119.

While devices of the type generally described in these prior art patents may be suitable for some compositions of masonry or concrete, it has been found that certain geographical areas form concrete or masonry with aggregate of relatively hard materials, such as granite or the like. Such material creates problems in screw type anchors of the prior art being unable to penetrate the walls of the bore or very large torque requirements being necessary to imbed the threads into the walls. It should be understood that the term masonry used herein is intended to be generic to stone-like building materials and includes but is not necessarily limited to, concrete, brick, fire brick materials, ceramic materials, etc.

It has been found that, even within the crowded art of threaded fasteners, a unique relationship between the several parameters of a threaded fastening system in concrete or masonry exists which will permit such a system to work effectively and efficiently in hard aggregate concrete. The instant invention therefore describes a unique relationship which includes a sharp crested thread having an included angle in the range of 50° to 65°, and a lead angle of the helix on the shank in the range of approximately 6° to $8\frac{1}{2}$° and a predetermined relationship between the diameter bore formed in the concrete or masonry and the crest diameter of the threaded fastener to provide imbedment in the walls of the bore of approximately 0.05 the crest diameter of the fastener. Such a fastener system has been found to penetrate hard aggregate masonry or concrete material using acceptable application torque and provide acceptable pull out strengths.

BRIEF DESCRIPTION OF THE DRAWINGS

The features and relationships of the invention will become apparent upon consideration of the following detailed description of several specific embodiments and especially when taken in conjunction with the accompanying drawings wherein.

DESCRIPTION OF THE PREFERRED EMBODIMENTS

Figure 1:
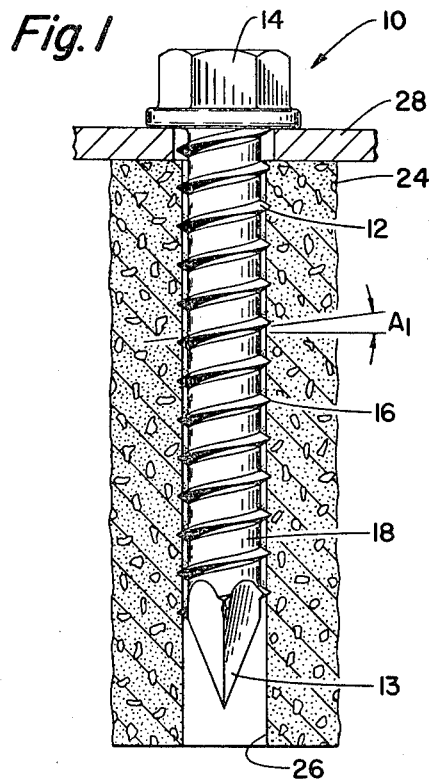
FIG. 1 is a side elevational view in partial section of the fastening system of this invention which incorporates the specifically designed threaded fastener and bore.

The fastening system of this invention may generally be described as including a threaded fastener 10 having an elongated shank which includes at least one thread form 12 formed thereon. The thread form, as will be shown later herein, is created with a predetermined helix angle, pitch and an included angle and includes a sharp pointed crest 16 creating a crest diameter of predetermined value. The fastening system further includes a bore 26 of predetermined diameter formed in a relatively hard aggregate concrete or masonry structure 24. The parameters and dimensions of the system will be described in detail later herein but it should suffice to say that the system is ultimately designed to in some way clamping or fixingly associate a fixture or attachment device 28 to the hard aggregate concrete structure 24.

The threaded fastener 10 may further include a relatively sharp point 13 to facilitate entry into the bore and will also include some form of wrenching surfaces on a driving head 14 to threadingly inser the fastener in the hard aggregate material, through the application of torque with known tools.

In the development of this invention it has been found that the included angle of the thread form 12 is an important consideration in the design of the total system. A thread form 12 with a sharp apex 16 should create a thread cross-sectional profile which has an included angle, shown in the drawings as $A_2$, which should be in the range of 50° to 65°. With this rather large included angle of the thread, the thread has sufficient durability and strength to penetrate hard aggregate material as opposed to the rather sharp crested 30° to 40° threads which had been suggested for use in conventional aggregate materials. The selection of the thread angle $A_2$ is one of the vital parameters in this threaded system, in that the thread angle must not be so small and thus weak as to be mutilated or bent when applied and permit little or no penetration in hard aggregate material or so large as to require installation torques that are excessive and which could lead to torsional failure of the anchor.

Figure 2:
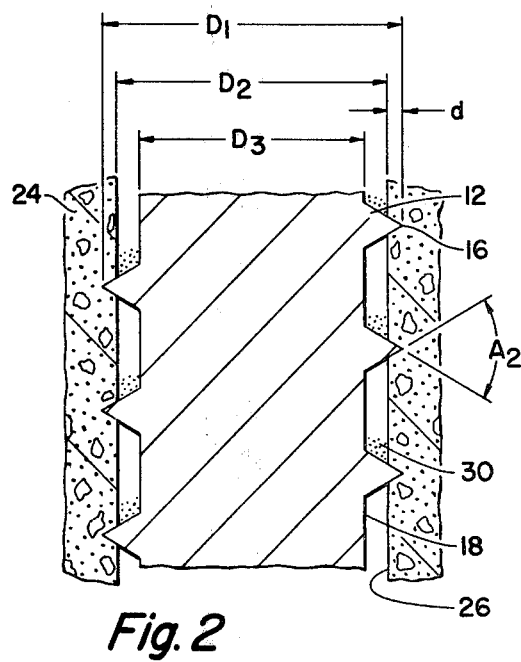
FIG. 2 is a partial, enlarged cross-sectional view taken axially of the fastener and bore of the fastening system.

A further vital parameter in the design of the hard aggregate securement system is the thread helix or lead angle which is shown as $A_1$ in FIG. 2. It has been found that this angle $A_1$ should be in the range of 6° to $8\frac{1}{2}$°. This range for the helix angle parameter has been found to be sufficient in the hard aggregate material. It has further been found that if the helix angle is smaller than 6° the fastener has a tendency to strip or deform the threads created in the bore. Even though the fastener threads may be able to penetrate the concrete or masonry, the combined rotative or axial forces of the fastener on the concrete may create excessive pressures on the thread formed in the concrete causing the internal thread to crumble and eliminate the threaded engagement. Conversely if the helix angle is greater than approximately $8\frac{1}{2}$° the torque to imbed the fastener in the concrete will be too great for normal commercial applicating equipment and could possibly lead to torsional failure of the anchor.

A third vital relationship in a system designed to penetrate and hold in hard aggregate material is the extent of penetration of the crest 16 of the thread of the device. A particular relationship between the crest diameter $D_1$ and the bore diameter $D_2$ has been found to be critical in conjunction with the above two parameters, namely, the included angle of the thread and the helix angle. It has been found that if the depth of engagement "d" shown in FIG. 2 is in the range of approximately 0.05 $D_1$ (crest diameter) then the combination effect of the unique relationship of the specific parameters "d", $D_1$, $D_2$, $A_1$ and $A_2$ will not only permit the threaded device to be engaged tightly within the hard aggregate walls, but will permit the fastener to be driven without mutilation or harm to either the concrete structure or to the threads. While it may appear that a much greater engagement is required for maximizing the effectiveness of the fastening system it must be understood that such a maximum depth of engagement may not at all be feasible or practical since it is to be accomplished using relatively standard thread engagement techniques which may require abnormally high torque. Thus it has been determined that the penetration value of 0.05 $D_1$ provides a reliable completed fastening system within the requirements of presently available materials for fasteners and applicating machine technology. It should thus become apparent that a relationship between the crest diameter $D_1$ and the bore diameter $D_2$ is critical and the fastening system should be designed so that the bore diameter $D_2$ is about 0.9 of the value of the crest diameter $D_1$.

A further parameter of the system which has been found to be important is the number of pitches of threads that are imbedded in the concrete i.e., essentially the axial penetration of the threaded shank into the bore. It has been found that at least approximately 6 pitches of such an imbedded thread in a system designed with the above parameters is important to maximize pull out strength of the anchor.

The threads per inch design parameter, while related to the lead angle $A_1$, is also included in specific examples of fastening systems designed in accordance with this invention. It has been found that the optimum thread per inch value as well as the helix angle value decreases as the nominal diameter of the fastener increases.

Specific examples of the fastening system designed in accordance with this invention are as follows:

|  | Nominal anchor diameter |
|---|---|
| 3/16" | |
| Crest diameter | .210" |
| Helix angle | 7.8° |
| Depth of thread engagement | .01" |
| Threads per inch | 11 |
| Thread included angle | 60° |
| ¼" | |
| Crest diameter | .250" |
| Helix angle | 7.25° |
| Depth of thread engagement | .0125" |
| Threads per inch | 10 |
| Thread included angle | 60° |
| 5/16" | |
| Crest diameter | .313" |
| Helix angle | 7.20° |
| Depth of thread engagement | .016" |
| Threads per inch | 8 |
| Thread included angle | 55° |
| ⅜" | |
| Crest diameter | .375" |

|  | Nominal anchor diameter |
|---|---|
| Helix angle | 6.9° |
| Depth of thread engagement | .02" |
| Threads per inch | 7 |
| Thread included angle | 55° |

The reasons for the unique effective relationships between the parameters noted above are not entirely known, but it is believed that it is a combination of the parameters to provide the optimum surface engagement between the threads and the masonry or concrete without substantially increasing the torque requirements and maximizing the pull out strength of the completed joint.

The root diameter $D_3$ must also be a part of the complete dimensioning of the system and it has been determined that a relationship between crest diameter $D_1$ and the root diameter $D_3$ should be about such that $D_3$ is 0.75 $D_1$ to provide the necessary space between the threaded fastener device 10 and the walls of the concrete bore 26. The dust or debris 30 developed during the imbedment of the fastener also creates an important ingredient in the fastening system and the distance between the root diameter $D_3$ and the bore diameter $D_2$ must be designed to collect the dust and to provide a sufficient amount of compaction of the dust which acts as a secondary frictional securement force within the system.

A further parameter found to be important in providing an adequate fastening system for hard aggregate masonry is the rotational speed and torque applied to the anchor during insertion in the bore. Typical rotational speeds of equipment generally used in driving threaded fasteners or in hammer drills is in the range of 1500 RPM. It has been found that anchors of the type described herein are advantageously applied at, what would be considered in the art, as low speeds and high torque. For example, a rotational speed generally not exceeding 250 RPM in conjunction with torque generally in the range of 150 in/lb. provides a properly secured anchor.

Figure 3:
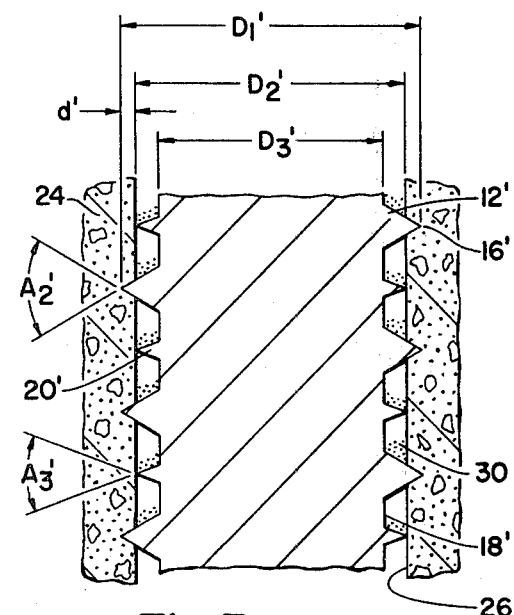
FIG. 3 is a view similar to FIG. 2 utilizing an alternate embodiment of the threaded fastener device.

Turning to FIG. 3, an alternate embodiment of the fastening system is shown wherein like reference numerals designate like portions of the invention with the addition of the "prime" notation. In this invention a second thread helix 20' is shown to be positioned intermediate the primary thread helix 12'. This thread helix 20' has a much sharper included angle shown as $A'_3$ and preferably this is in the range of 30° to 50°. With this smaller included angle the amount of dust or concrete debris 30 can be maximized and yet provide a stabilizing influence in the system by centering the device and thus maximizing efficiency and effectiveness of the total system described above.

While many of the parameters above for specifically designed systems may be found individually in some prior art threaded devices, it is submitted that the specific parameters for each specific system taken in a composite produce a new and unexpected result in the inbedment of threaded fastener devices in hard aggregate concrete. It may also be apparent that the invention has been described with several specific embodiments in mind and it is evident that many alternatives, modifications and variations will be apparent to those skilled in the art in light of the foregoing description and because of the foregoing description. Accordingly it is intended to embrace all such alternatives, modifications and variations as fall within the spirit and broad scope of the appended claims.

I claim:

1. A screw type anchor for retention in a bore of predetermined diameter formed in a masonry type support surface in combination with said surface, the anchor including an axially extending shank with an enlarged head portion at one extremity and a support surface entering portion at the opposite extremity, the head portion including rotation inducing surfaces, a spaced, helical, continuous thread having a predetermined threads per inch and predetermined crest diameter formed on the shank and extending from the entering portion towards the enlarged head portion for a substantial portion of the length of the shank, the helical thread having a V-shaped cross-sectional configuration with the flanks of the thread intersecting at an included angle in the range of approximately 50°–65°, the helical thread extending about the shank at a lead angle in the range of approximately 6° to 8½°, the predetermined bore diameter is approximately equal to 0.9 the predetermined crest diameter of the anchor, so that the average penetration of the crest of the thread into the wall of the bore is approximately 0.05 the predetermined crest diameter, whereby the anchor can be threadingly inserted in said bore by cutting mating threads in the wall of the bore at an acceptable insertion torque level while optimizing the pull-out strength of the anchor in the support surface.

2. A screw type anchor for retention in a bore of predetermined diameter formed in a masonry type support surface, the anchor including an axially extending shank with an enlarged head portion at one extremity and a support surface entering portion at the opposite extremity, the head portion including rotation inducing surfaces, a spaced, helical, continuous thread having approximately eleven threads per inch and a crest diameter of approximately 0.210 inches formed on the shank, and said thread extending from the entering portion towards the enlarged head portion for a substantial portion of the length of the shank, the helical thread having a V-shaped cross-sectional configuration with the flanks of the thread intersecting at an included angle in the range of approximately 50°–65°, the helical thread extending about the shank at a lead angle in the range of approximately 6° to 8½°, wherein the anchor can be threadingly inserted in said bore by cutting mating threads in the wall of the bore at an acceptable insertion torque level while optimizing the pull-out strength of the anchor in the support surface.

3. A screw type anchor for retention in a bore of predetermined diameter formed in a masonry type support surface, the anchor including an axially extending shank with an enlarged head portion at one extremity and a support surface entering portion at the opposite extremity, the head portion including rotation inducing surfaces, a spaced, helical, continuous thread having approximately ten threads per inch and a crest diameter of approximately 0.250 inches formed on the shank, and said thread extending from the entering portion towards the enlarged head portion for a substantial portion of the length of the shank, the helical thread having a V-shaped cross-sectional configuration with the flanks of the thread intersecting at an included angle in the range of approximately 50°–65°, the helical thread extending about the shank at a lead angle in the range of approximately 6° to 8½°, wherein the anchor can be threadingly inserted in said bore by cutting mating threads in the wall of the bore at an acceptable insertion torque level while optimizing the pull-out strength of the anchor in the support surface.

4. A screw type anchor for retention in a bore of predetermined diameter formed in a masonry type support surface, the anchor including an axially extending shank with an enlarged head portion at one extremity and a support surface entering portion at the opposite extremity, the head portion including rotation inducing surfaces, a spaced, helical, continuous thread having approximately eight threads per inch and a crest diameter of approximately 0.313 inches formed on the shank, and said thread extending from the entering portion towards the enlarged head portion for a substantial portion of the length of the shank, the helical thread having a V-shaped cross-sectional configuration with the flanks of the thread intersecting at an included angle in the range of approximately 50°–65°, the helical thread extending about the shank at a lead angle in the range of approximately 6° to 8½°, wherein the anchor can be threadingly inserted in said bore by cutting mating threads in the wall of the bore at an acceptable insertion torque level while optimizing the pull-out strength of the anchor in the support surface.

5. A screw type anchor for retention in a bore of predetermined diameter formed in a masonry type support surface, the anchor including an axially extending shank with an enlarged head portion at one extremity and a support surface entering portion at the opposite extremity, the head portion including rotation inducing surfaces, a spaced, helical, continuous thread having approximately seven threads per inch and a crest diameter of approximately 0.375 inches formed on the shank, and said thread extending from the entering portion towards the enlarged head portion for a substantial portion of the length of the shank, the helical thread having a V-shaped cross-sectional configuration with the flanks of the thread intersecting at an included angle in the range of approximately 50° to 65°, the helical thread extending about the shank at a lead angle in the range of approximately 6° to 8½°, wherein the anchor can be threadingly inserted in said bore by cutting mating threads in the wall of the bore at an acceptable insertion torque level while optimizing the pull-out strength of the anchor in the support surface.

* * * * *